United States Patent [19]
Hock

[11] 3,822,942
[45] July 9, 1974

[54] METHOD OF TESTING A LENGTH, ANGLE, PATH DIFFERENCE OR SPEED BY DETECTING INTERFERENCE AND APPARATUS THEREFOR

[75] Inventor: Fromund Hock, Wetzlar, Germany

[73] Assignee: Ernst Leitz GmbH, Wetzlar, Germany

[22] Filed: May 31, 1972

[21] Appl. No.: 258,297

[30] Foreign Application Priority Data
June 3, 1971 Germany............................ 2127483

[52] U.S. Cl. .............................. 356/106 R, 356/114
[51] Int. Cl. ............................................... G01b 9/02
[58] Field of Search ...... 356/106, 107, 113; 350/12, 350/13

[56] References Cited
UNITED STATES PATENTS
3,382,761  5/1968  Dyson ............................... 356/108
3,529,894  9/1970  Hock .................................. 356/113
3,601,490  8/1971  Erickson ............................ 356/106

Primary Examiner—Ronald L. Wibert
Assistant Examiner—Conrad Clark
Attorney, Agent, or Firm—Krafft & Wells

[57] ABSTRACT

A testing method utilizing detecting interference in a two-beam interferometer includes in addition to the already known steps the step of splitting the combined beam into a plurality of signal beams after the partial beams have been combined in a combining step. Means are provided for additionally influencing the relative phase angle of complementary states of polarization in the signal beams to generate quadrature signals. By the use of polarization analyzers with two output pairs, push-pull signals in quadrature are obtained. In addition it is possible to introduce corrections common to all signals by shifting the phase relation in the combined beam prior to the splitting in the signal beams.

10 Claims, 11 Drawing Figures

METHOD OF TESTING A LENGTH, ANGLE, PATH DIFFERENCE OR SPEED BY DETECTING INTERFERENCE AND APPARATUS THEREFOR

BACKGROUND OF THE INVENTION

The invention relates to a method of and apparatus for testing a length, angle, path difference or speed.

In two-beam interferometers corresponding to the arrangements according to Michelson, Mach-Zehnder or Sagnac, or in grating interference arrangements, the path difference or phase change between two partial ray bundles, connected with the measuring process, may deliver no information about the sign of such phase changes or the sign of the rate of change. By different processes and apparatus, this information can additionally be gained and evaluated by measuring techniques. These measurement processes underlie the principle that phase-displaced, interlinked sinusoidal pairs of signals, as they are derived from interference phenomena, represent an electric rotating field.

The properties of known interferometers, which provide such rotating field signals, may be unsatisfactory on various grounds connected with the application. In some of the instruments, part of the light which runs back out of the interferometer into the laser light source causes interference. With other apparatus it may not be possible, or it may only be possible with considerable expenditure, to generate, for the subdivision of modulation periods, a plurality of optical signals which have prescribed phase differences between them. In the generation of 90° phase-displaced rotating field signals, simple methods for the simultaneous attainment of optical push-pull signals, which stabilize the working points of the signal amplifiers, may not be found. Besides, it was hitherto not possible in some methods, without an optically or mechanically expensive interference with at least one of the partial ray bundles, to displace the interference phase of all signals by the same amount, and thereby to compensate for the effect to be measured, or additionally to the measuring effects to inject correcting changes into the output signals.

SUMMARY OF THE INVENTION

According to the concept of the invention, there is provided a method of testing a length, angle, path difference or speed by detecting interference, comprising the steps of so combining two coherent partial beams having polarization states which are complementary to one another that the partial beams after said combining step travel substantially in the same direction, of separating the combined beam geometrically or physically at a separating location into at least two signal beams that are unchanged in the pair of complementary states of polarizaiton and — in the case of linearly complementary polarized partial beams — of making different the path difference between perpendicularly vibrating componets by passing the signal beams through optically anisotropic material; of bringing about interference in each individual signal beam by passing the beams through linearly polarizing analyzing means of which — in the case of circularly polarized partial beams — the direction of transmittance of the analyzing means is set to different relative angles either directly or optically by means of optically active substances, the interference generating at least two optical push-pull signals offset from one another by an angle other than 180°; and of evaluating said push-pull signals by photoelectric means to determine the length, angle, path difference or speed.

In one method each of the signal beams comprises a linearly polarized signal beam, at least one of the signal beams being passed through an optically anisotropic material to make different the path difference between mutually perpendicularly vibrating partial beam components in the respective signal beams, while in another method each of the signal beams comprises a circularly polarized signal beam, individual images being formed from the push-pull signals derived from each respective signal beam at mutually different angular positions relative to the separating location.

Conveniently the images are real images, while alternatively the images are virtual images, optically active material being situated in the paths of the signal beams to form the images.

Said evaluating step may comprise generating electric output signals at photoelectric detecting means.

The method may comprise the step of passing the combined beam through a variable path difference generator to change the relative phase of the partial beam components of the combined beam.

The method may comprise the step of splitting an initial beam into at least four coherent partial beams, individual pairs of the partial beams being subjected to such combining steps, the two partial beams of each pair travelling in the same plane.

According to a second concept of the invention, there is provided apparatus for testing a length, angle, path difference or speed, comprising a beam combiner to combine two coherent partial beams to form a combined beam which comprises partial beam components in individual mutually complementary states of polarization corresponding to the states of polarization of the respective partial beams before said combination, beam separating means to separate the combined beam into at least two signal beams in mutually equivalent states of polarization, linearly polarizing analyzing means to generate from the signal beams at least two optical push-pull signals, and evaluating means to evaluate the optical push-pull signals.

Preferably, the evaluating means comprises photoelectric detecting means.

The apparatus may comprise a beam splitter to split an initial beam into at least four coherent partial beams, and deflecting means to direct individual pairs of the partial beams to respective beam combiners, the two partial beams of each pair travelling in the same plane.

The beam separating means may comprise, for example, a divider lens which comprises a pair of half lenses arranged to produce two mutually divergent signal beams, a polarization-neutral divider prism assembly or a diffraction grating. The diffraction grating may have a line width to gap width ratio of 1:1.

The analyzing means may comprise, for example, a Wollaston prism or a polarizing foil analyzer.

For the carrying out of the method using one of many beam dividing devices such as neutral or polarizing divider mirrors, one or two-dimensional diffraction gratings or bi-refringent beam splitting components, which may be of known kind, one or more pairs of partial ray bundles coherent with one another are generated, which are polarized complementarily to one another at the recombining position. As combining means, the same components can be used as for the beam splitting, that is neutral or polarizing divider mirrors, diffraction gratings or bi-refringent components. The partial ray bundles, running in the same direction in space together after the recombination, are not yet capable of interference with one another. The following representation of the behaviour of complementarily polarized coherent pairs of beams is simplified in that as extreme cases only either combined components vibrating linearly perpendicularly to one another or left and right circularly polarized components are considered. All intermediate conditions can be converted selectively into the one or other extreme condition, for example, in known manner, by the insertion of a bi-refringent compensator into the beam path, exactly as the two extreme cases can themselves be converted into one another by $\lambda/4$-plates orientated at 45°.

First, let the case of the components vibrating linearly, perpendicularly to one another, be considered. According to the path or phase difference of the two light beams, coherent with one another and running together, the resulting polarization condition of both partial waves runs through the entire range of conditions between linear polarization with phase equality and light polarized at 90° thereto in phase opposition and the intermediate conditions of right and left rotating elliptical and circular polarization. In principle, such an interferometer behaves as a bi-refringent crystal plate of variable thickness, which is irradiated from a single-axis optical crystal with the boundary surfaces cut parallel to the optical axis and perpendicular to it. Thus all measuring methods of crystal optics for the determination of path differences or path difference changes at bi-refringent crystals may be applied to the waves resulting from the partial ray bundles. With the use of a compensator, for example one according to Soleil-Babinet, or of a material controlled by electric fields, as in a Pockels cell or Kerr cell, behind the combining position the phase positions of the partial beams to be brought to interference by a linearly polarizing analyzer can be displaced arbitrarily relative to one another for compensation or correction. If one splits up the partial ray bundles, perpendicular to one another and coherent with one another, either directly after the combining position or after the compensation element by the use of a divider, into two or more partial beams, the condition being put on the divider, that it divides the two polarization components perpendicular to one another for practical purposes in the same proportion, then pairs of partial beams are available, which can be displaced relative to one another in their relative phase position by additional polarization-optically anisotropic components arranged in the main vibration directions, thus providing the rotating field information necessary for the determination of the sign of the change direction.

To cause interference, thereafter each pair of partial beams runs through a linearly polarizing analyzer, which is orientated with its vibration direction at 45° to the two partial beam components vibrating perpendicularly to one another. Particulary advantageous may be the application of analyzers with two vibration directions, perpendicular to one another in the output. Polarizing divider mirrors or bi-refringent means for splitting up beams, such as crystal plates cut at 45° to the optical axis, bi-refringent crystal plates, Wollaston prisms or Savart plates, can serve as such analyzers. The interference phases at the two analyzer outputs are modulated constantly in push-pull to one another, on energy grounds, with absorption freedom of the polarizing dividers acting as analyzers. Behind such an analyzer, pairs of signals gained via photoelectric converters are thus easily transformable by sum-and-difference amplifiers into direct-current-free interferometer signals. An arbitrary number of such direct-current-free interferometer signals can be generated which corresponds to the number of the signal bundles derived from the two recombined partial beams by beam division.

Analogous relations are present with the combining of right and left circularly polarized radiation components. The behaviour of such a two-beam interferometer corresponds to the behaviour of a substance with circular bi-refringence, the thickness of which is variable. A quartz crystal irradiated along the optical axis can serve as a model. According to the type of quartz employed, the vibration plane of linearly polarized light is rotated in the sense of a right- or left-handed screw. The vibration form arising from the united circular components is linearly polarized light with rotating vibration azimuth. There can be applied here the processes of crystal optics with circular bi-refringence to the combination beam. With the help of a rotary compensator, which for example is put together from a respective right and left rotating quartz crystal, or which consists of an optically active solution, into which a glass rod is dipped for altering the thickness of the solution, the vibration plane may be altered supplementarily exactly as with the help of a faraday cell, which can be controlled by the current of a magnet coil. If one splits up the linearly vibrating combination bundle directly after the combining position or afer the compensation element with the help of a divider or system of dividers not altering the vibration condition, geometrically or physically into two or more signal beams of similar kind, then by rotation of the main vibration directions of linear vibration analyzers arranged in the respective partial beam, relative to one another, the light modulation phase may be altered, without loss of light, exactly as with similarly orientated analyzers by layers of optically active substances placed in front of the analyzers. Thus the rotating field information may be provided. Particularly advantageous may be also here the application of analyzers with two vibration directions perpendicular to one another in the output, as in the case of the combination of linear components polarized perpendicularly to one another.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
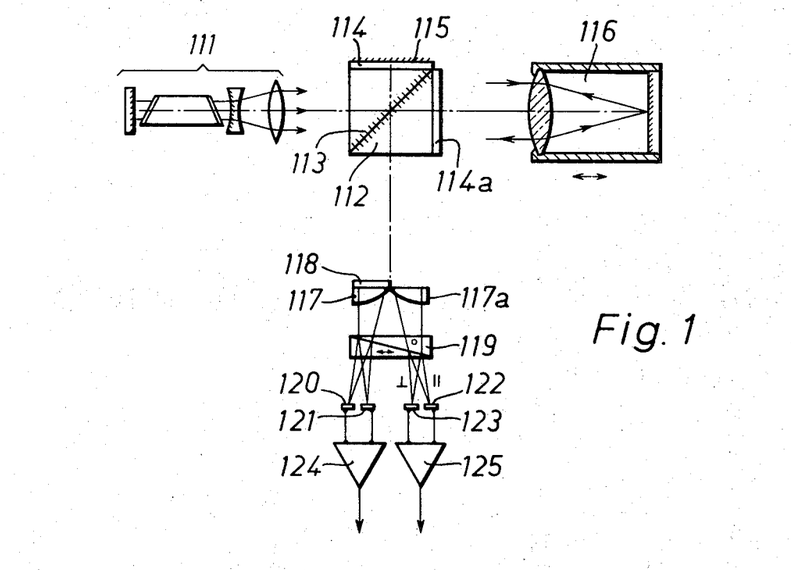
FIG. 1 is a first embodiment of a laser length measuring interferometer.

FIG. 1 shows a simple laser length measuring interferometer, in which the return of interfering light into the light source is avoided. A light source 111, a laser vibrating only in the TEM OO-mode, generates a light beam which is coherent over the entire bundle cross section and which is polarized linearly at 45° relative to the plane of the drawing. In a divider cube 112, a polarizing multiple layer 113 splits the incident light into two equally large components vibrating perpendicularly to one another. The reference beam impinges on a plane mirror 115, through a λ/4 platelet 114. There it is reversed in its direction, and runs back to the divider surface 113. During the two-fold passage through the λ/4 platelet 114, which is oriented with its main vibration direction at 45° to the polarization direction of the reference beam, the vibration direction of the light running back rotates through 90°, so that it can pass completely through the divider surface 113. The measuring beam runs through a λ/4 platelet 114a and returns after reflection at the "cats eye reflector" 116 consisting of an objective with a plane mirror in the focal plane, laterally and vertically reversed back along its path. This reflector, which is coupled with the measuring movement, ensures that tilting movements do not take effect in beam tiltings. Only parallel displacement movements change the position of the returning beam. By the two-fold passage through the λ/4 platelet 114a, the vibration direction of the measuring beam has likewise been rotated through 90°, so that the measuring beam, after complete reflection at the divider surface 113, running parallel is combined again with the reference beam. By inclination of all surfaces generating disturbance reflexes, relative to the laser beams, it can be ensured that no light runs back into the laser to disturb the laser operation. Besides, one attains with the arrangement according to FIG. 1 the length measurement information from the complete light flux of the laser. For the preparation of the attainment of rotating field signals the recombined ray bundle is split geometrically (or, as an alternative, physically) into two signal ray bundles lying beside one another. In order to combine the light in small focal spots, a divider lens put together from two half lenses 117 and 117a is fitted symmetrically to the ray bundle cross-section. In the one signal ray bundle, a λ/4 plate 118, orientated with its main vibration directions parallel to the vibration components of the ray bundle, delays the interfering ray bundles additionally by 90° in phase. As a common analyzer with two respective outputs, a Wollaston-prism 119 serves, which is oriented with its main vibration directions at 45° to the vibration components of the interfacing ray bundles. Photo-diodes 120, 121 receive light modulated in push-pull, the modulation of which is displaced in phase altogether by 90° relative to the modulation at photo-diodes 122 and 123 associated with the second signal ray bundle. If desired, instead of the phase displacement angle of 90°, other phase displacement angles may be used, other than 180° or a multiple thereof. Sum-and-difference amplifiers 124 and 125 give a direct-current-free pair of rotating field signals, the rotating field of which runs through one signal period per λ/2 reflector displacement. These signal periods can be split, for example by known processes, into signal period fractions, and the full signal periods can be counted. In order to diminish the sensitivity towards air schlieren, in the arrangement of FIG. 1 the beam delay device 118 for the 90° phase displacement may alternatively be constructed as an annular platelet, to which the geometric ray bundle splitting elements are correspondingly conformed.

Figure 2:
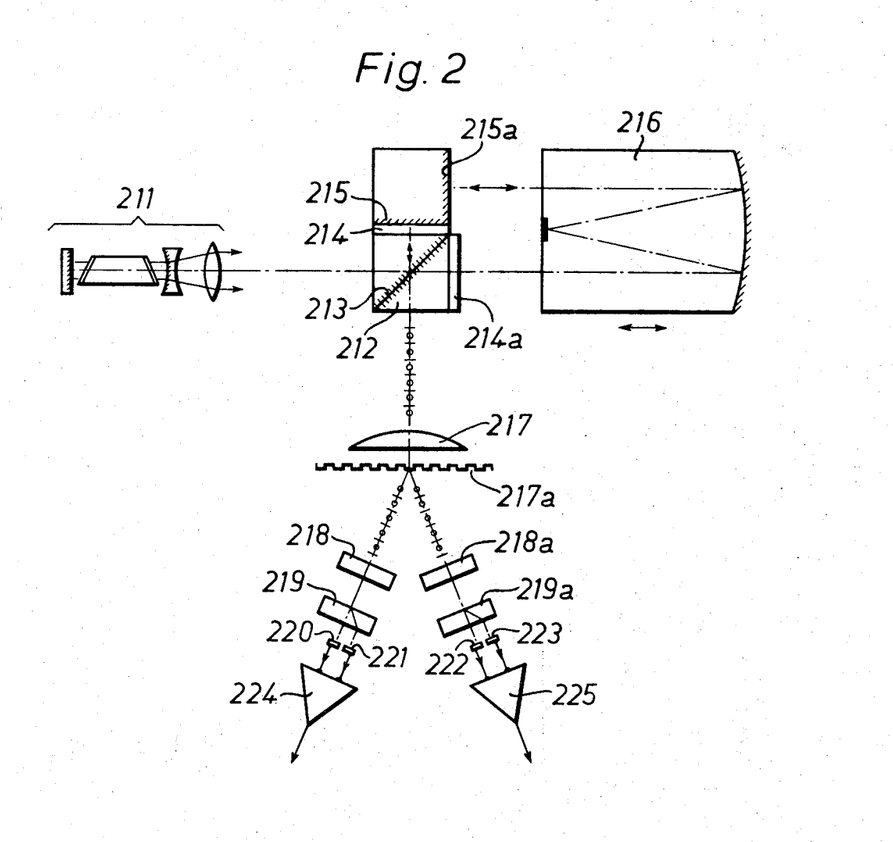
FIG. 2 is a second embodiment of a laser length measuring interferometer.

FIG. 2 shows a second embodiment of a laser length measuring interferometer, which delivers a full period of a rotating field signal per λ/4 displacement of a reflector 216. The light from the laser 211 is linearly polarized, and oriented with the vibration direction at 45° to the plane of the drawing. The divider layer 213 in the polarizing divider 212 splits and combines the measuring and reference beams, which are reversed back upon themselves at the mirror 215 or respectively 215a. Thereby the tilting-insensitive reflector 216 is also insensitive to parallel displacement movements. The entire radiation flux of the laser finds itself, after the beam combination, in the components of the reference and measuring ray bundles vibrating perpendicularly to one another, since by the λ/4 plates 214 and 214a the polarization directions of the returning reference or measuring partial beam have been brought into the transmission or reflection direction of the polarizing divider surface 213. Through the lens 217, four focal spots are generated, in that firstly through a phase grating 217a with a line/gap ratio of 1:1 and λ/2 phase delay, the recombined ray bundle is split into two equal ray bundles, which correspond to the ±1 diffraction orders of the phase grating. Each of the signal ray bundles impinges on a λ/8 platelet 218, 218a, the two platelets being oriented in the main vibration directions of the measuring and reference beam components respectively. Thus the one is in the addition position, and the other in the subtraction position, so that the resulting phase difference between the two signal ray bundles again amounts to λ/4. After running through of the λ/8 platelets 218 and 218a, the bi-refringent plates 219 and 219a, cut at 45° to the optical axis and oriented with the main vibration directions at 45° to the main vibration directions of the signal ray bundles, split up the signal ray bundles into push-pull modulated focal point images, which are fed by receivers 220, 221, 222, 223 as push-pull signals to the amplifiers 224 and 225.

Figure 3:
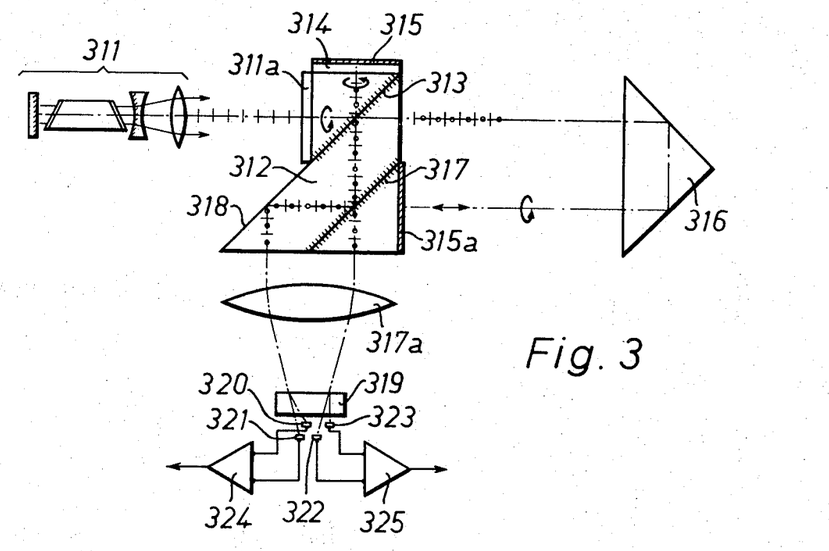
FIG. 3 shows a laser length measuring interferometer, combined in one rigid unit.

In FIG. 3 a laser length measuring interferometer combined into a single rigid assembly is shown. From a laser illumination arrangement 311 emerges linearly polarized light, which vibrates in the plane of the drawing. A λ/4 plate 311a arranged at the entry surface of an interference prism 312 illuminates a polarizing divider layer 313 with circularly polarized light. As reflector, here a triple prism 316 is employed, the six total reflections of which during forward and return passage, by the choice of the refractive index of the prisms and applied dielectric layers, by the phase discontinuity, ensure that with the total reflection the prism acts as a whole as a λ/2 plate, and thus reverse the vibration direction of the light running back. The comparison beam is reflected at a plane mirror 315 cemented on. The recombined measuring and comparison ray bundles, still vibrating perpendicularly to one another, are split into two signal ray bundles at the polarization-neutral divider surface 317. With the totally reflecting deflection at the surface 318, the phase angle between the parallel and perpendicularly vibrating components is displaced additionally by 90° by suitable design of the total reflection, by choice of refractive index and vapour-deposited dielectric layers or additional cementing on of a bi-refringent lamella. A small angular deviation in the reflection angles ensures that a small angular divergence α remains between the two signal beams. This has by way of consequence, that two light source images lying beside one another are generated by a lens 317a. A calcite splitting piece 319 serves as analyzer for the two signal ray bundles, and generates therewith four push-pull signals, which are gained by the amplifiers 324 and 325 from the currents of photoelectric receivers 320–323. One rotating field period is run through for each λ/4 reflector displacement.

Figure 4:
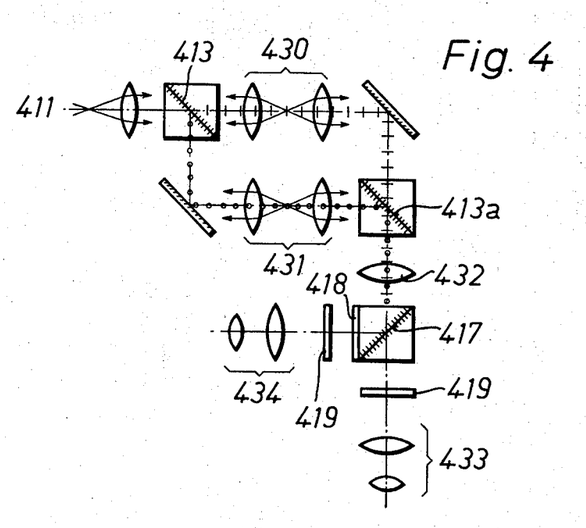
FIGS. 4 and 5 illustrate the application of the invented method to different types of Mach-Zehnder micro-interferometers.

In FIG. 4, the application of the method to a Mach-Zehnder micro-interferometer represented simplified is shown. A light ray bundle coming from a light source (not shown) is split at a polarization divider 413 into two coherent partial ray bundles vibrating perpendicularly to one another. According to the requirements, which are given by the micro-objects, the partial ray bundles, polarized perpenticularly to one another, run through pairs of micro-objectives 430 and 431, or the two partial ray bundles are converted, by λ/4 platelets (not shown) in front of the micro-objectives 430, 431, into left and right circular waves, which after running through the micro-objectives, are converted, by a second pair of λ/4 platelets (not shown), into linearly polarized ray bundles again, which vibrate perpendicularly to the shown polarization directions. The beam combining is conducted at the polarizing divider layer 413a. A tube lens 432 images the object or respectively the comparision plane into the image planes of eyepieces 433, 434. The polarization-neutral divider layer 417 distributes the light among two signal ray bundles, in which analyzers 419 and 419a are disposed.

In order to displace the images offered to the eyepieces 434 and 433, either for photoelectric evaluation or for half-shadow methods, in interference phase, and thus also to make visible the sign significance of interference fringe deviations, a bi-refringent phase-displacing plate 418 is arranged in one of the two signal ray bundles. A mechano-optically or electro-optically acting compensator can be inserted into the image plane of the eyepiece 434 in the recombined ray bundle, in order to carry out path difference measurements between different object parts. For the photoelectric interference microscopic signal evaluation, the analyzers 419, 419a, in a similar manner to the preceding examples, are constructed as analyzers with two outputs. For increasing the resolution of visual measuring processes, the analyzers 419 and 419a can be executed as foil analyzers also in the intermediate image planes of the eyepieces 434, 433 as foil halves orientated in each case perpendicularly to one another with the separating edge in the middle of the image. A half shadow balance with interference contrast yields a sensitive indicator.

Figure 5:
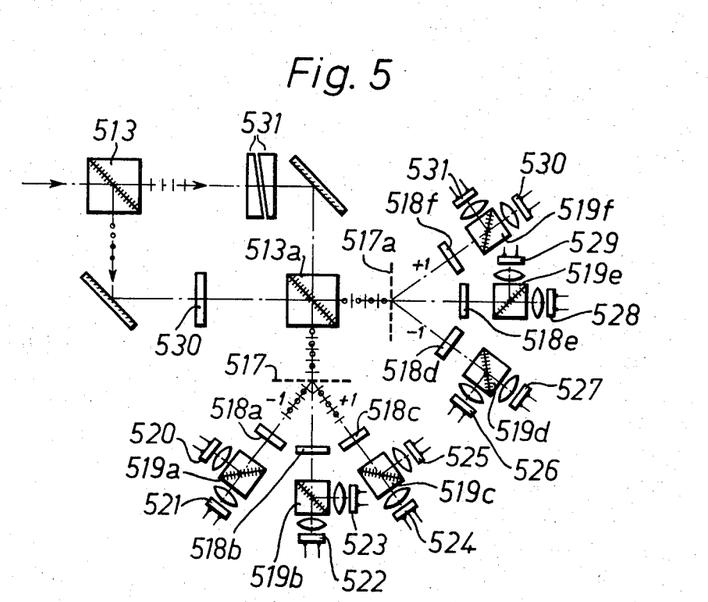

In FIG. 5, it is shown on a further Mach-Zehnder construction, that by utilisation of the combining of two pairs of partial ray bundles and subsequent splitting-up of each pair of combinaton partial ray bundles into several signal beams which are analyzed after mutual phase displacement, a multi-component photoelectric rotating field may be generated, which can increase the resolution of the rotating field signal phase measurement, in that one establishes which of the pairs of signals in each case lies nearest to the null passage of the direct-current-free alternating current signals.

A divider 513 generates, as a polarizing divider, measuring and comparison ray bundles coherent with one another and vibrating perpendicularly to one another. After running through of the object and comparison spaces, which contain an object 530 and a compensation wedge 531, the ray bundles are combined again at the polarization-neutral divider 513a. Thereby arise two combination ray bundles, which are fed to phase gratings 517, 517a acting as dividers, with equal diffraction intensities for the 0. and ±1 diffraction order. The six signal ray bundles run through six differently thick bi-refringent plates 518a – 518f, which impress different phase delays on the measuring and comparison ray bundle pairs. Polarization dividers 519a – 519f, orientated at 45° relative to the plane of the drawing, are arranged as analyzers behind the phase-displacing plates 518a – 518f. From each of the polarizing dividers, a push-pull amplifier (not shown) is fed, via two photo-diodes 520 – 531. The 12 phase-displaced null passage states of the six signals can make digitally measurable object conditions different in path difference by λ/12 .

Figure 6:
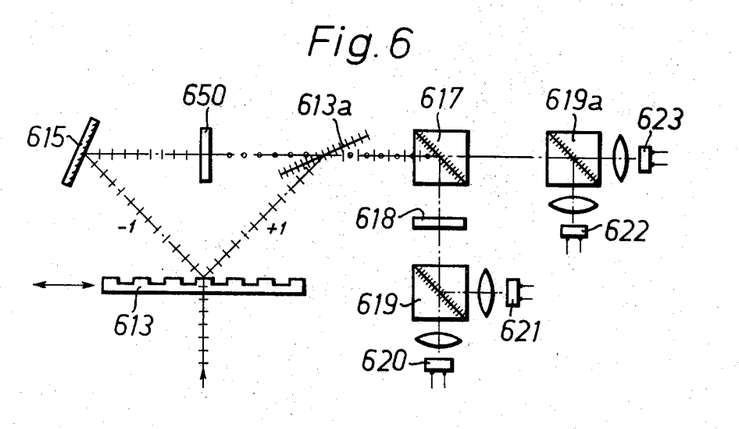
FIG. 6 shows a scanner for a linear or radial phase grating.

In FIG. 6, a scanner for a linear or radial phase grating is shown, which transforms the grating movement into rotating field signals. For each division period, two complete rotating field rotations of the signal arise, in the case that the ±1 diffraction order of the phase grating 613 built up with λ/2 phase displacement and line/gap ratio of 1:1 is brought to interference. The phase grating 613 illuminated with linearly polarized light splits the light preferably into the ±1 diffraction order. The diffraction orders are coherent with one another, and determined in phase by the relative position of the grating and the illumination ray bundle. In the moved condition, the two partial ray bundles are displaced, by the Doppler effect, in frequency by +Δν or respectively −Δν, relative to the frequency of the incident light. With the help of a deflecting mirror 615 and a polarizing beam combiner 613a, this light is brought from the +1 and the −1 diffraction order in the same direction. In order to make possible the passage of the light from the −1 diffraction order through the polarizing beam combiner, the λ/2 plate 650 rotates the vibration direction of the light by 90°. The dividing into signal ray bundles, phase displacement in the signal ray bundles and the analysis by polarizing dividers takes place as with the above described cases by means of the assemblies 617 – 623. With a saving of the neutral divider 617, one would also have been able to construct the beam combiner 613as a neutral divider. The two combined ray bundles then arising would then have been able to be utilized again for the attainment of a rotating field signal, after phase displacement.

Figure 7:
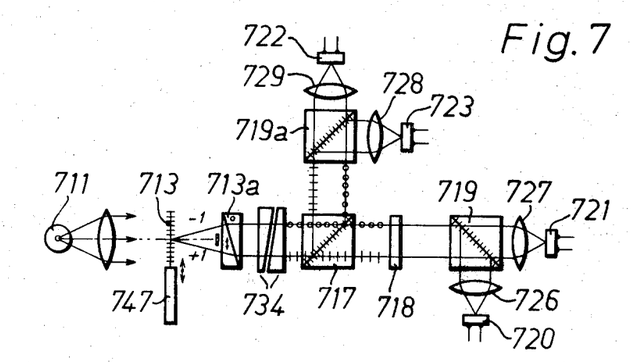
FIG. 7 illustrates a further application of the invented method.

FIG. 7 shows the application of the process to an otherwise known arrangement. A light source 711, for example, a gallium arsenide electro-luminescence diode illuminates a diffraction grating 713, which is rigidly connected with a test piece 747, the displacement of which is to be measured. A Wollaston prism 713a generates two parallel partial ray bundles, polarized perpendiculary to one another, which originate from the +1 and −1 diffraction orders of the measuring grating 713. The likewise arising, not parallel, partial ray bundles of the Wollaston prism are destroyed unused. A compensator placed after, which consists of two similarly orientated bi-refringent crystal wedges 734, permits the phase displacement between the light bundles originating from the ±1 diffraction order, and thereby the insertion of correction values into the length measurement. A following neutral divider 717 supplies the light to two analyzers 719 and 719a, which are arranged with their main vibration directions rotated through 45° relative to the plane of the drawing. The λ/4 plate 718 generates the 90° phase displacement necessary for the rotating field, between the two push-pull signal pairs, which arise at receivers 720, 721, 722 and 723. Lenses 726 − 729 combine the still separated bundles for interference at the receiver surfaces.

Figure 8:
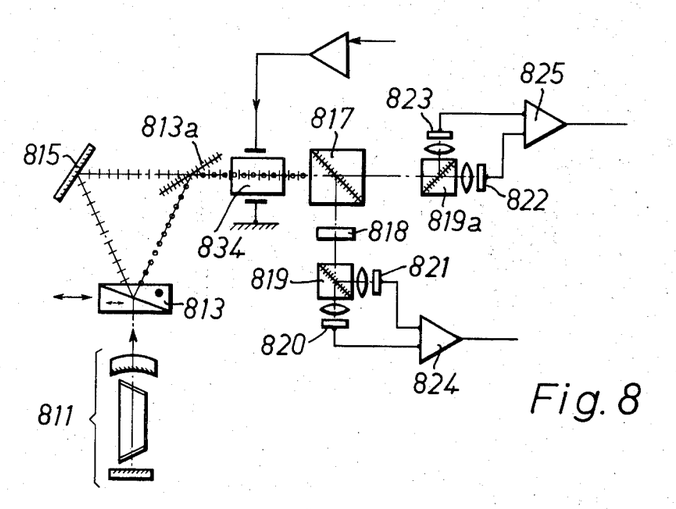
FIG. 8 shows the employment of a Wollaston prism as a measuring element.

In FIG. 8, a Wollaston prism 813 is employed as a measuring element for the transformation of linear movements into optical signals. As in FIG. 6, by a source 811 two partial ray bundles, coherent with one another and vibrating perpendicularly to one another in front of the polarizing divider 813a are generated, which are lined up with the help of a mirror 815 in the same beam direction, after the recombination. As compensator or modulator, the Pockels cell 834 is provided, for the phase displacement between the components of the recombined ray bundle. By variation of the tension at the electrodes of the electro-optical crystal 834, for example of copper chloride, the rotating field angle of the output signal can be modulated at high frequency when the Wollaston prism is standing still. Thus for example, the signal equality of a sine and cosine signal may be determined with high precision, in that the difference signal of the sine and cosine is demodulated phase-sensitively relative to the modulation tension. With linear connection between the applied tension and the phase change between the two polarization components in the Pockels cell 834, it is also possible to apply the tension of the Pockels cell as a measure for signal period fractions by so feeding the difference between the sine and cosine signal in a closed regulating circuit, at a high loop amplification to the Pockels cell, that the entire system balances itself on the smallest signal differences between the sine and cosine signal. The further processing of the signals for the purpose of the generation of an electric rotating field takes place in already described manner by means of the assemblies 817 − 825.

Figure 9:
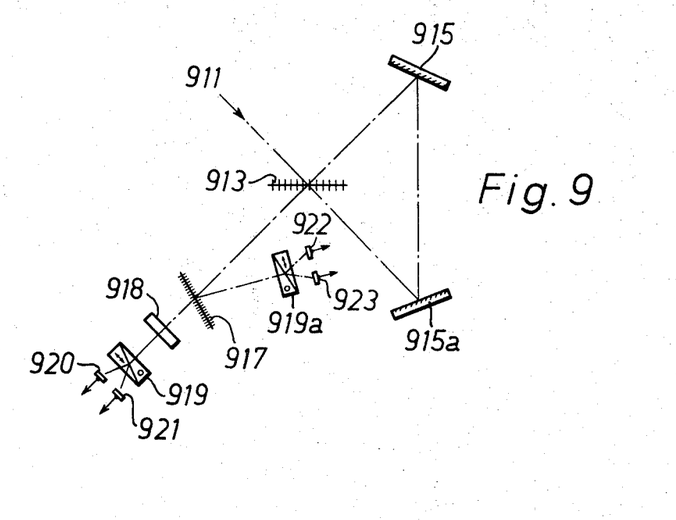
FIG. 9 shows the application of the invented method to an interferometer of the Sagnac type.

In an interferometer of the Sagnac type, shown in FIG. 9, a laser (not shown) at 911 illuminates a polarizing dividider mirror 913 with light which is circularly polarized or linearly polarized at 45° to the plane of the drawing. There are generated two partial ray bundles, vibrating perpendicularly to one another and rotating to the right or respectively left, which, after turning round via reflectors 915, 915a leave the interferometer again loss-free, as the ray bundle firstly transmitted is also transmitted again after turning round, while the firstly reflected ray bundle is also reflected again after turning round. A neutral divider 917 splits the pair of recombined ray bundles into two signal ray bundles. Wollaston prism 919 and 919a acting as analyzers convert the light from these ray bundles into push-pull signals at the receivers 920 − 923, after the plate 918, displacing the phase by λ/4 for the rotating field generation, is passed through by one signal ray bundle. For conforming to the desired measurement operation, lenses, aperture stops and so on can be arranged in the circulating partial ray bundles, for example in known manner, in order to distribute left-handed and right-handed rotating beams as measurement comparison beams at the object position among different ray bundle cross-sections.

Figure 10:
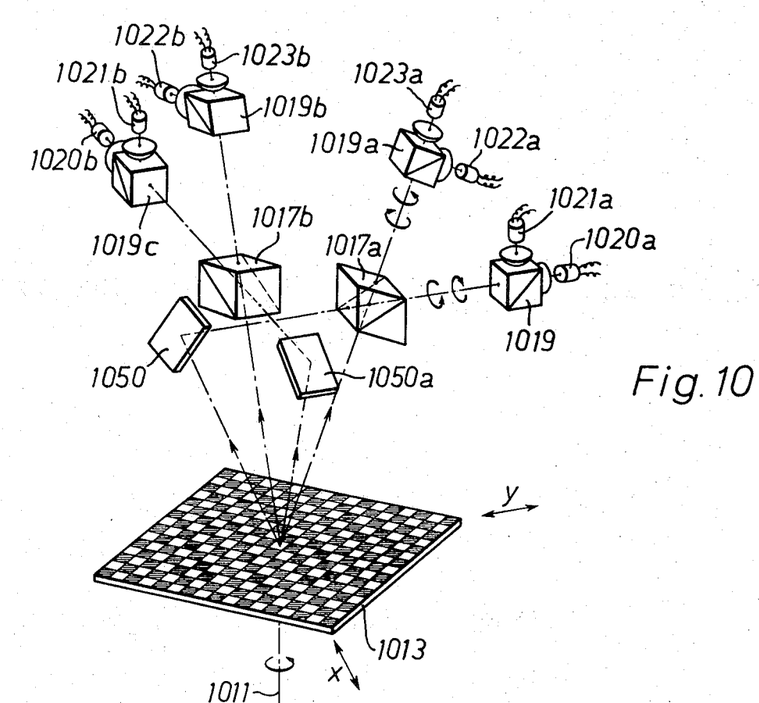
FIG. 10 shows a measuring device for simultaneous length measuring according to two coordinate directions.

FIG. 10 shows a measuring device for simultaneous length measurement according to two coordinate directions. A monochromatic laser light source 1011, radiating circular light on to a chess board cross grating 1013 is, as in the case of the measuring object connected with the grating, not specifically shown. If the grating is a chess board phase grating with λ/2 delay, in each case 16 percent of the irradiated intensity passes into the four partial bundles of the first diffraction orders, which are coherent with one another. Analogously to the arrangement in FIG. 6, partial bundles irradiated in each case with diagonal projection are combined in pairs. The circular partial bundles leave polarization-neutral divider cubes 1017, 1017a as four complementary signal pairs with a resulting linear vibration direction. By bi-refringent rear surface mirrors 1050, 1050a it is ensured that the partial beam components at the combining become complementary to one another. Polarizing divider cubes 1019, 1019a, 1019b and 1019c are rotated in each case in pairs by 45° relative to one another in their vibration azimuths, so that the push-pull signals from receivers 1020a, 1021a and 1022a, 1023a, as well as 1020b, 1021b and 1022b, 1023b in each case are different in modulation phase by 90°. Push-pull amplifiers (not shown) arranged after the photoelectric receivers, deliver direct-current free rotating field signals separated according to displacement coordinates x and y. When a movement only according to the x-coordinate takes place, the photoelectric receivers designated with b respond, while when movement only according to the y-coordinate takes place only the other four photoelectric receivers are excited.

Figure 11:
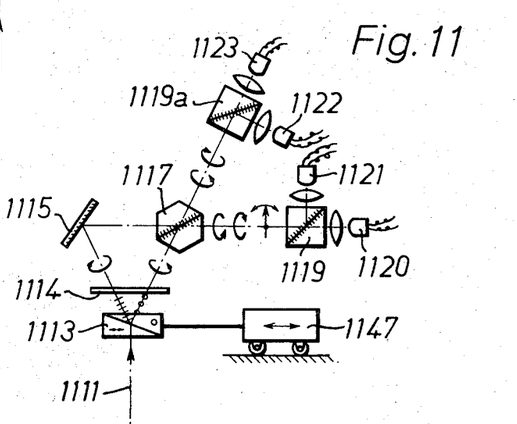
FIG. 11 shows a Wollaston prism in parallel to the beam entry surface.

With the embodiment example shown in FIG. 11, a Wollaston prism 1113, put parallel to the beam entry surface, is connected rigidly with a test piece 1147, the linear movement of which is to be measured. The Wollaston prism 1113 is illuminated with light from a laser 1111, so that the splitting-up of the light at the wedge surface of the prism generates complementary linearly polarized partial beams which are coherent with one another. Over the Wollaston prism, a λ/4 plate 1114 is arranged, orientated at 45° to the main vibration directions, so that right-handed and left-handed circularly polarized partial beams arise. With the help of a mirror 1115 and a polarization-neutral divider 1117, the partial beams are deflected into two combined partial beam pairs. Each of the two combination beams is representable by a linearly polarized vector rotating with the movement of the Wollaston prism. the two polarization divders 1119 and 1119a are rotated in their vibration azimuths by 45° to one another, so that at the photoelectric receivers 1120, 1121 and 1122, 1123 two push-pull signal pairs, phase-displaced relative to one another by 90°, are generated, which are then further processed in the described manner.

The described method may thus be applied to different types of interferometer, to conform the interferometer optimally to the measuring requirements.

In the described methods using a two-beam interference arrangement, in the stationary condition equal light frequency distributions may be present in the partial beams.

What is claimed is:

1. Method of testing a length, angle, path difference or speed by two-beam detecting interference, comprising the steps of:
   a. generating two coherent partial beams comprising a reference beam and a measuring beam having polarization states which are complementary to one another and combining said reference and measuring beams to travel substantially in the same direction;
   b. separating said combined beam at a separating location into at least first and second signal beams unchanged in the pair of complementary states of polarization and each comprising said reference and measuring beam;
   c. bringing about interference in said first and second signal beams by passing the beams through linearly polarizing analyzing means;
   d. making a polarization phase shifting between said first and second signal beams thus generating at least first and second optical signals for said first signal beam and third and fourth optical signals for said second signal beam, each of said optical signals having reference and measuring beam components and a polarization state which is offset from one another by an anlge other than 180°; and
   e. evaluating the difference between said first and second optical signals, and said third and fourth optical signals by photoelectric means wherein said differences are proportional to said length, angle, path difference or speed.

2. The method of claim 1, wherein in the combined beam the relative phase angle of the two complementary vibrating beam components is varied by optical elements generating a controllable, variable difference between the two components.

3. The method of claim 1, wherein in the interference device more than two coherent partial beams are generated, and wherein partial beams generated in the same plane are combined in pairs to give them complementary vibrating states of polarization.

4. The method of claim 1, wherein said separating of steps (b) is carried out geometrically with lenses.

5. The method of claim 1, wherein said separating of step (b) is carried out physically with a polarizing divider.

6. The method of claim 1, wherein said polarization phase change of step (d) is carried out by passing one of said signal beams through optically anisotropic materials.

7. Apparatus for resting a length, angle, path difference or speed by two-beam detecting interference, comprising:
   a. means for generating at least two coherent partial beams comprising a reference beam and a measuring beam having linear polarization states which are complementary to one another;
   b. means for combining said two partial beams so as to travel as a combined beam in substantially the same direction;
   c. beam splitting means in the path of said combined beams for separating said combined beams into at least first and second signal beams;
   d. a linearly polarizing analyzer in the path of each signal beam for bringing about an interference within each signal beam, and generating at least first and second optical signals for said first signal beam and third and fourth optical signals for said second signal beam, each of said optical signals having reference and measuring beam componets;
   e. optically anisotropic elements positioned in the path of one of said signal beams for making different the path difference between the components vibrating in complementary direction to one another and phase shifting said first signal beam offset relative to said second signal beam by an angle other than 180°; and
   f. photoelectric means for evaluating the difference between said first and second signal beams, said first and second optical signals, and said third and fourth optical signals wherein said differences are proportional to said length, angle, path difference or speed.

8. Apparatus for testing a length, angle, path difference or speed by two-beam detecting interference, comprising:
   a. means for generating at least two coherent partial beams comprising a measuring beam and a reference beam having circular polarization states which are complementary to one another;
   b. means for combining said reference and measuring beams so as to travel as a combined beam in substantially the same direction;
   c. beam splitting means in the path of said combined beams for separating said combined beams into at least a first signal beam and a second signal beam;
   d. a linearly polarizing analyzer in the path of each signal beam for bringing about an interference within each signal beam and generating at least first and second optical signals for said first signal beam and third and fourth optical signals for said second signal beam, each of said optical signals having reference and measuring beam components;
   e. optically active means for active complimentary polarization states of said first signal beam; and
   f. photoelectric means for evaluating the difference between said first and second signal beams, said first and second optical signals, and said third and fourth optical signals wherein said differences are proportional to said length, angle, path difference or speed.

9. The apparatus of claim 8, wherein said optically active means of (e) is a polarizer.

10. The apparatus of claim 8, wherein said optically active means of (e) is an anisotropic lens.

* * * * *